July 22, 1941.  J. E. CARLSON  2,249,883
ATTACHMENT FOR PLANTERS
Filed April 14, 1939  2 Sheets-Sheet 1
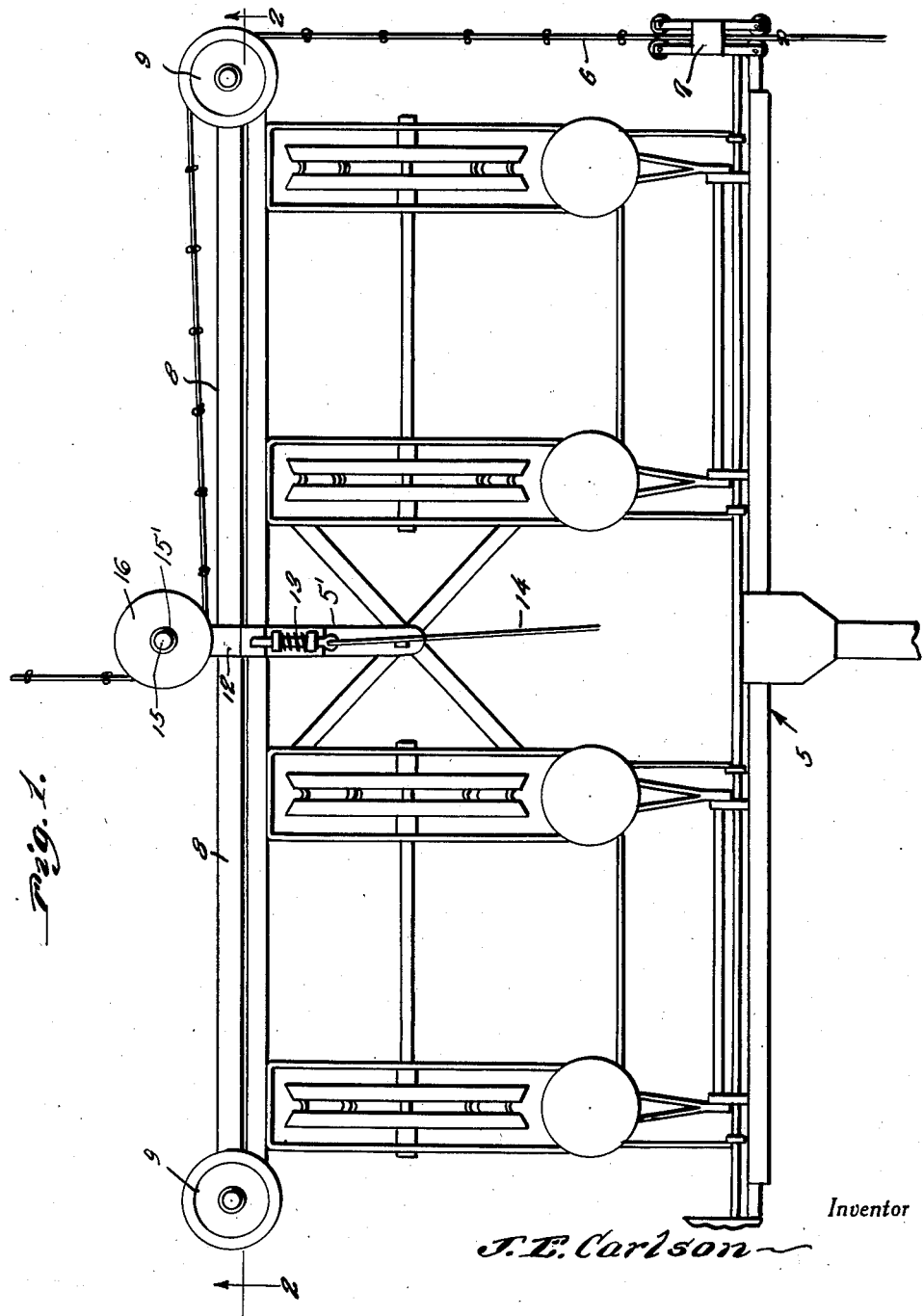
Inventor
J. E. Carlson
By Clarence A. O'Brien
and Hyman Berman
Attorneys

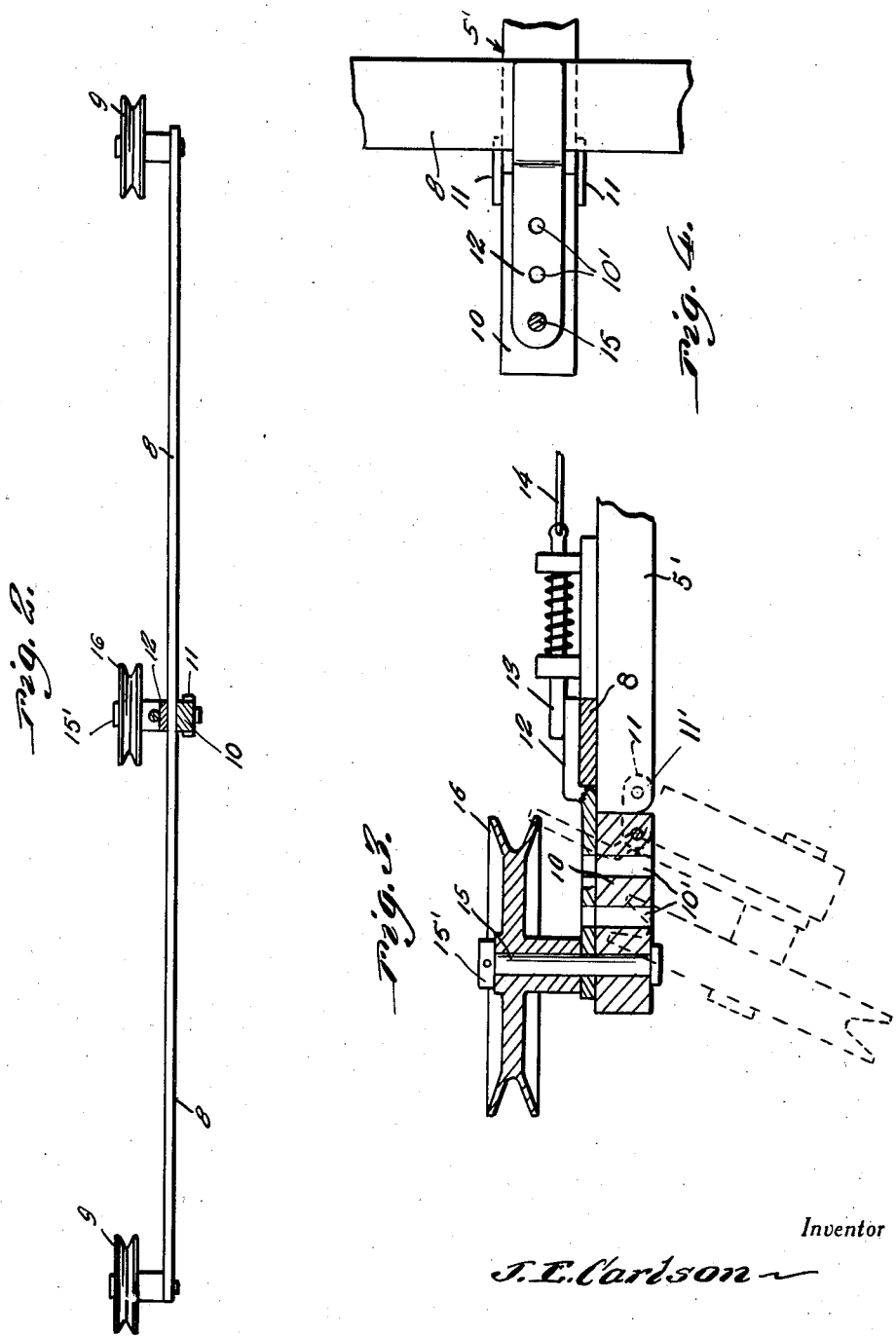

Patented July 22, 1941

2,249,883

UNITED STATES PATENT OFFICE 2,249,883

ATTACHMENT FOR PLANTERS

John E. Carlson, Beresford, S. Dak.

Application April 14, 1939, Serial No. 267,879

4 Claims. (Cl. 111—48)

This invention relates to an attachment for a four-row planter, the general object of the invention being to provide means for supporting a pulley at each rear corner of the planter over which a check wire passes after the wire has passed through the trip mechanism of the planter, with a third pulley arranged at the rear of the planter and midway between the other two pulleys and over which the wire passes after leaving one of the other pulleys so that the wire is placed between the two pairs of rows planted by the apparatus, with means whereby the operator can cause the middle pulley to move to a position where it will release the wire whenever desired.

Another object of the invention is to provide means whereby the middle pulley can be adjusted on its supporting member forwardly and rearwardly so as to advance or retard the actuating operation of the seed dropping means by the checks on the wire.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a conventional four row planter equipped with an attachment constructed in accordance with my invention.

Figure 2 is a sectional view taken on the line 2—2 of Figure 1.

Figure 3 is a fragmentary side elevation, partly in section, illustrating the mounting of the center check wire pulley.

Figure 4 is a fragmentary plan view, partly in section, illustrating a keeper strap for the center pulley to be engaged by the latch.

Referring in detail to the drawings, the numeral 5 indicates a conventional type of a four row planter adapted to be operated by a conventional check wire 6 and is equipped at opposite ends with conventional check heads 7 for the check wire, it being understood that when the planter is traveling in one direction over a field, one of the check heads receives the wire and when the planter is operating in a reverse direction over the field the other check head receives the check wire.

Mounted on the rear portion of the frame of the planter and arranged transversely thereof is a supporting member 8, the securing thereof to the planter frame may be accomplished in any well known manner. The ends of the supporting member terminate a limited distance beyond the ends of the planter frame and have journaled thereon end check wire pulleys 9.

A block 10 is hinged to the rear end of a central portion 5' on the planter frame by the hinge links 11 which are connected with the rear end of the part 5' by the pin 11', the parts being so arranged that the block can move from a horizontal position downwardly and forwardly as shown in dotted lines in Figure 3. The block extends rearwardly at the central portion of the supporting member 8 and the top part of the block has secured thereto a keeper plate 12 adapted to engage over the supporting member 8 when the block is in raised position. To hold the block in raised position a slidable spring-influenced latch bolt 13 is mounted on the planter frame and has connected thereto an operating cable 14 which is adapted to be manually actuated.

The block 10 carries a shaft 15 on which is journaled an intermediate check wire pulley 16. In other words, the check wire pulley 16 is arranged to pay out the check wire from the planter intermediate the ends of the planter frame and in rear and between the pairs of rows planted by the four-row planter.

When the latch bolt 13 is withdrawn from the keeper plate 12, the supporting block 10 will pivot downwardly, as shown in dotted lines in Figure 3, carrying therewith the check wire pulley 16 so that the latter assumes a tilted position and this frees the check wire from the pulley. This is desirable when the planter is to be turned at the end of planting of four rows across the field in one direction. As the check wire becomes disengaged from the pulley 16, the check wire also becomes disengaged from the end pulley over which it is traveling due to the planter turning away from the check wire in order to make the turn for the reverse travel over the field.

It is to be understood that when the planter is traveling in one direction over the field the check wire passes over one of the end pulleys as well as over the center pulley and on the planter traveling over the field in a reverse direction the check wire is placed over the other end pulley as well as over the center pulley 16. It will be seen that the center pulley 16 places the wire in rear of the center of the machine as the machine travels across the field and this reduces the space between the two anchoring stakes so that the angle at which the wire extends across the field is much less than it would be if this center pulley was not used.

In first placing the stakes, one stake is placed approximately in rear of the center of the machine when the machine is ready to make its first trip across the field with the other stake in line with the outer end of the machine or that end to the left of the operator when the machine is traveling in the direction shown in Figure 1. Then when the machine reaches the other end of the field the operator pulls upon the cable 14 to permit the block 10 and the pulley 16 to drop which frees the wire from said pulley 16 and the operator frees the wire from the mechanism 7 and the stake at said other end of the field is then moved to a position between the next two pairs of rows to be planted. In other words, after the machine has been turned around to begin another trip across the field this stake would be in rear of the center of the machine in the new position of the machine.

As shown the block 10 is formed with a longitudinally extending row of holes 10' any one of which is to receive the shaft 15 of the pulley 16 so that the pulley can be adjusted forwardly or rearwardly on the block and this adjustment provides means for positioning the checks on the wire so that the rows will be planted in cross alignment. The shaft 15 is provided with a detachable head 15' so that this head can be removed to permit the shaft 15 to be placed in another hole in the block, these holes also extending through the member 12.

It is believed that the foregoing description, when taken in connection with the drawings, will fully set forth the construction and advantages of this invention to those skilled in the art to which such a device relates, so that further detailed description will not be required.

Having described the invention, I claim:

1. In a four-row planter having check heads adjacent its ends, a pulley in the rear of each head over which a check wire passes after passing through a head, a third pulley over which the wire passes after passing from the first pulley and means for supporting the third pulley from the central portion of the rear part of the planter at equal distances from the first pulleys.

2. In a four-row planter having check heads adjacent its ends, a pulley in the rear of each head over which a check wire passes after passing through a head, a third pulley over which the wire passes after passing from the first pulley and means for supporting the third pulley from the central portion of the rear part of the planter, said supporting means for the third pulley including a member extending rearwardly from the central portion of the rear part of the planter, and said member having a longitudinally extending row of holes therein and an axle for the third pulley adapted to be placed in any one of said holes.

3. In a four-row planter having check heads adjacent its ends, a pulley in the rear of each head over which a check wire passes after passing through a head, a third pulley over which the wire passes after passing through the first pulley and means for supporting the third pulley from the central portion of the rear part of the planter, said supporting means for the third pulley including a member extending rearwardly from the central portion of the rear part of the planter, and said member having a longitudinally extending row of holes therein and an axle for the third pulley adapted to be placed in any one of said holes, means for pivotally connecting said supporting member at its front end to the rear part of the planter for movement about a horizontal pivot, said pivot extending transversely of the planter, and latch means for holding the supporting member in horizontal position, the supporting member with the pulley thereon swinging downwardly when the latch means are released.

4. In a planting machine of the class described having planter check heads adjacent its ends, a transversely extending bar connected with the rear end of the planting machine, a pulley supported at each end of the bar, a pulley having a check wire passing thereover after the check wire passes through a head in front of the said pulley, a rearwardly extending supporting member connected with the rear part of the machine at the center thereof, hinge means for connecting the front end of the supporting member to the machine for movement from a horizontal position to a downwardly tilted position, latch means for holding the supporting member in horizontal position and a third pulley rotatably supported on the upper side of the supporting member at the rear thereof and over which the wire passes after passing over one of the first-mentioned pulleys.

JOHN E. CARLSON.